United States Patent [19]

Brown et al.

[11] Patent Number: 4,984,219

[45] Date of Patent: Jan. 8, 1991

[54] METHOD AND APPARATUS FOR DECODING OF FREQUENCY INVERSION BASED SCRAMBLERS

[75] Inventors: Daniel P. Brown, Elmhurst; Larry C. Puhl, Sleepy Hollow, both of Ill.

[73] Assignee: Motorola, Inc., Schaumburg, Ill.

[21] Appl. No.: 456,881

[22] Filed: Dec. 26, 1989

[51] Int. Cl.[5] .............................................. H04K 1/04
[52] U.S. Cl. ..................................... 380/39; 370/120; 380/38
[58] Field of Search ............................ 380/38, 39, 40; 370/120

[56] References Cited

U.S. PATENT DOCUMENTS

| | | |
|---|---|---|
| 3,651,404 | 3/1972 | Rollins . |
| 3,688,193 | 8/1972 | McDonald . |
| 3,882,466 | 5/1975 | Poorvin . |
| 3,970,937 | 7/1976 | Bates et al. . |
| 4,228,321 | 10/1980 | Flanagan . |
| 4,652,699 | 3/1987 | Akaiwa . |
| 4,817,141 | 3/1989 | Taguchi ............................ 380/38 X |
| 4,827,507 | 5/1989 | Marry et al. . |
| 4,852,166 | 7/1989 | Masson ............................ 380/40 X |

OTHER PUBLICATIONS

Van Lannep et al., "Frequency Inversion Scrambler Uses Micro-Processed SSB Audio", Mobile Radio Technology, Aug. 1984, pp. 34–40.
Dennis, "Who's Got a Secret?", Communications, Sep. 1984, pp. 62,63,68,69,70.

Primary Examiner—Thomas H. Tarcza
Assistant Examiner—Tod Swann
Attorney, Agent, or Firm—Raymond A. Jenski; Rolland R. Hackbart

[57] ABSTRACT

A method and apparatus for decoding of frequency inversion based scramblers is disclosed. A quadrature amplitude modulation detector determines the frequency of the tone used for inverting the scrambled signal by determining which of a plurality of quadrature detector pairs, each using a different conversion frequency, has the greatest magnitude difference between the quadraturely related signals. The frequency of the quadrature pair with the greatest difference is the frequency of the inverting tone during the inverting period of time. This frequency information is used to generate a reinversion tone to unscramble the scrambled signal.

8 Claims, 3 Drawing Sheets

METHOD AND APPARATUS FOR DECODING OF FREQUENCY INVERSION BASED SCRAMBLERS

BACKGROUND OF THE INVENTION

This invention relates generally to analog based scrambling decoding techniques and more particularly relates to the method and apparatus for unscrambling a frequency-hopping analog frequency inversion scrambled signal without advance information about the sequence of frequencies used for inversion.

A relatively simple and inexpensive technique for providing secure communications over a narrow bandwidth channel utilizes frequency inversion of the input analog signal to introduce security. An input analog signal is conventionally mixed with a single frequency tone in a square-law mixer or balanced modulator and the lower sideband of the product of the single frequency tone and the input analog signal is selected by a filter. The resultant output signal is one in which the analog signal has the lowest frequency components and highest frequency components reversed and shifted in frequency.

A more secure technique changes the frequency of the mixing tone at predetermined time intervals such that more than one tone is used over a period of time to invert the input analog signal. In this way, the inversion frequency hops among several tone frequencies according to a predetermined sequence of tone frequencies and provides additional security for the scrambled signal. Such a system is further described in U.S. Pat. No. 4,827,507. The apparatus and method outlined in this patent requires that the predetermined sequence of tones used in the inversion process be communicated between the transmitter transmitting the scrambled signal and the receiver receiving the scrambled signal so that the scrambled signal can be unscrambled. However, under some circumstances it is desirable to unscramble the scrambled transmission without the inversion tone hopping sequence being communicated.

SUMMARY OF THE INVENTION

Therefore, it is one object of the present invention to provide an unscrambled output signal from a scrambled input signal.

It is another object of the present invention to recover an unscrambled output signal from a frequency hopping inversion scrambler without communication of the inversion tone frequency hopping sequence from the scrambled signal transmitter to the scrambled signal receiver.

Accordingly, these and other objects are encompassed in the present invention which uses quadrature amplitude modulation (QAM) theory to determine the sequence of frequencies of the inversion frequency being used.

DETAILED DESCRIPTION OF THE PREFERRED EMBODIMENT

The preferred embodiment of the present invention operates in a secure analog frequency inversion system in which signals (generally speech) are frequency inverted in an audio passband by an inversion frequency tone having a frequency which is changed from time to time such that high frequency signals are caused to be placed at the low frequency signal portion of a limited bandpass and low frequency signals are placed at the high frequency portion of the channel bandwidth. The transmitter of the system, which transmits the scrambled signal, establishes a psuedo-random hopping code of the scrambling frequency at the initiation of any desired secure message. Generally, there is an exchange of frequency hopping information, or seeds, which conveys information to the receiver which results in the sequence of frequency inversion hopping tone frequencies becoming known to the descrambler of the receiver. This knowledge of the tone frequency sequence enables the scrambled signal to be synchronously decoded or reinverted to yield an unscrambled received audio signal.

Figure 1:
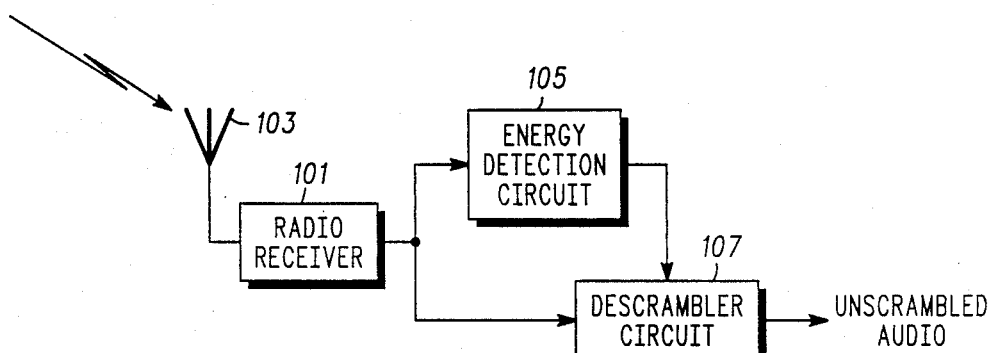
FIG. 1 is a block diagram of a radio receiver and descrambler which may employ the present invention.

The decoder of the present invention can provide an unscrambled audio output without advance knowledge of the frequency hopping pattern of the inversion frequency. The simplified block diagram of FIG. 1 illustrates the receiver and processing circuit which can accomplish this task.

A conventional radio receiver (101), which may be a commerically available radio telephone transceiver such as a Model No. F19ZEA84399AA manufactured by Motorola, Inc., may be employed to receive a scrambled transmission on a radio channel via conventional antenna (103) and convert the received radio signal into a audio signal output which is in a scrambled form. In the preferred embodiment of the present invention, this scrambled audio output is applied to an energy detection circuit (105) and a descrambler circuit (107) which work in combination to provide an unscrambled audio output from a scrambled audio input.

While it is possible to employ a technique which analyzes the scrambled transmitted audio signal by performing a fast Fourier transform (FFT) in order to find the fundamental pitch frequency and any harmonics of the original speech signal, speech signals usually contain nonharmonic relationships and unvoiced sounds which do not produce clearly defined spectra. These facts greatly complicate the processing requirements of a FFT technique. Therefore, the descrambling approach of the preferred embodiment of the present invention is based upon quadrature amplitude modulation (QAM) theory, which does not require any spectral analysis or particular spectral content of the input audio signal.

Most applications of QAM involve the transmission of digital data by 2 orthogonal carriers of the same frequency —a "sine" carrier and a "cosine" carrier. Conceptually, these two carriers may be considered to be the X,Y coordinates of a two dimensional plane, upon which symbols of 1 to 6 bits form a constellation pattern. This analysis is well known from high speed modem literature. The constellation pattern is formed because each baud, or multi-bit symbol, may be decomposed into two components at the modem transmitter. One component modulates the cosine carrier, or X-axis, and the other modulates the sine carrier, or Y-axis. Both modulated carriers are simultaneously applied to a transmission path and are transmitted without mutual interference because the sine and cosine functions are orthogonal. The modem receiver detects the energy of each carrier during a symbol time in order to estimate which constellation point was transmitted.

A frequency inversion scrambler differs from a QAM modem in that the signal of energy modulates a sine carrier but no energy modulates the cosine carrier (or vice versa). Therefore, a QAM modem-like receiver should find energy along a 1-dimensional axis if the received carrier frequency matches the transmit carrier frequency. If the carrier frequency of the receiver is not correct, then the receiver carrier's phase changes (with respect to the transmit carrier) will distribute equal amounts of recovered energy along the sine and cosine axis of the XY coordinates of the 2-dimensional plane. This latter condition is similar to a defective carrier recovery process in a modem receiver. This single-dimension energy detection is the basis of the present invention.

Figure 2:
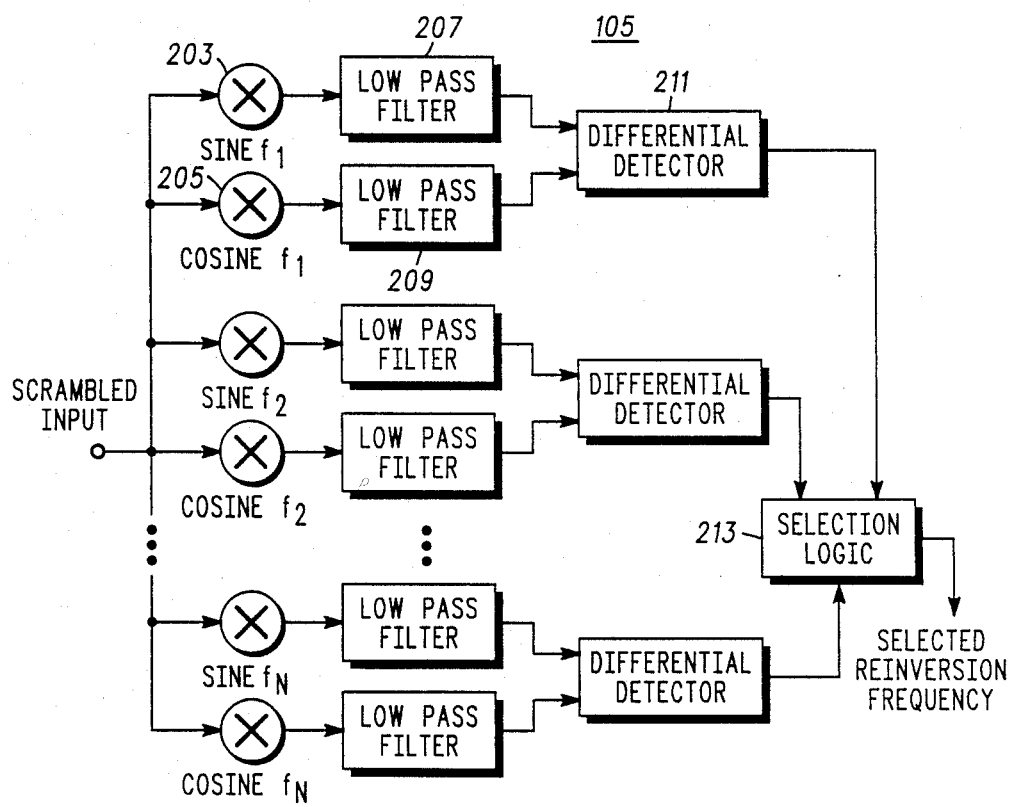
FIG. 2 is a block diagram of an energy detection circuit for a descrambler employing six frequency inversion signals.

FIG. 2 is a more detailed block diagram of the energy detection circuit (105) of a first embodiment used in the present invention. As shown, energy detection circuit (105) has the capability of detecting "n" carrier frequencies. A sine and a cosine detector are used for each of the "n" carrier frequencies such that an energy calculation is performed for each time segment for a portion of scrambled speech (as determined by the period of time one inversion tone frequency is used to invert the original signal). Scrambled audio input is applied to 2n mixers, lowpass filtered, and applied to a differential detector, for each sine/cosine pair. Following one of the sine/cosine pair signal paths, it can be seen that scrambled input is applied to a conventional mixer (203) and conventional mixer (205). A conventionally generated analog tone having frequency $f_1$ (the sine tone) is also applied to mixer (203). An identical frequency tone but shifted in phase by 90° (the cosine tone) is conventionally generated and applied to mixer (205). The output of mixer (203) is lowpass filtered by a lowpass filter (207), which is a conventional lowpass filter having a cutoff frequency at approximately the frequency $f_1$ of the descrambling frequency. Each of the frequencies $f_1 \rightarrow f_n$ are selected to be one of the inversion frequenies employed by the analog scrambler transmitter. Thus, a lowpass filter (207) follows mixer (203) in the signal path to eliminate unwanted mixer sidebands. The inclusion of lowpass filter (207) (and the remainder of the lowpass filters following the other mixers of the energy detector circuit) aids the detection process, although satisfactory results have been obtained without the lowpass filters. Likewise, a lowpass filter (209) is coupled to the output of mixer (205) and is also tuned for a cutoff frequency at approximately the frequency $f_1$. The output of lowpass filter (207) and lowpass filter (209) are applied to a conventional differential detector (211), which in the preferred embodiment, may be an arithmetic difference that compares the results of energy-related calculations. These calculations, in the preferred embodiment, are a simple sum of samples (squares).

The differential detector (211) functions by choosing the sine/cosine pair having the greatest energy differential at the end of the current scrambled time segment portion thereof. The same process is utilized by each sine/cosine pair for frequencies $f_2 \rightarrow f_n$. At the end of one time segment, the sine/cosine pair having the greatest energy difference as detected by the differential detectors is selected as the most likely candidate for the frequency of the inversion frequency transmitted during the time segment. The selection of the most likely frequency is accomplished by selection logic (213), which in the preferred embodiment is a simple digital comparison operation. The output of selection logic (213) is applied to the descrambler circuit (107).

Figure 3:
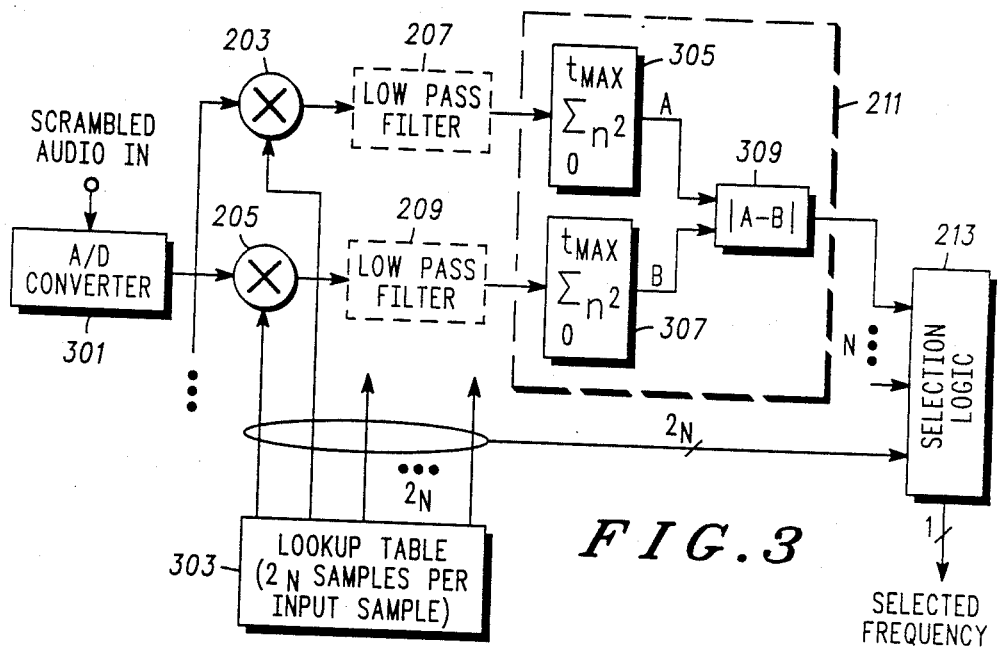
FIG. 3 is a block diagram of an energy detection circuit like that of FIG. 2 and realized by a DSP.

The preferred embodiment of the present invention using a digital signal processor (DSP) is shown in the block diagram of FIG. 3. The scrambled audio is input to an analog to digital converter (301), which may be an MC14402L Codec or similar device, and output in digitized form to the remainder of the energy detection circuit. A digital signal processor, such as a DSP56001 available from Motorola, Inc., is used to perform the functions of the energy detector. The output of A/D (301) is applied to the algebraic multipliers (203 and 205) where the signal is mixed against the sine and cosine phases of a frequency $f_1$. These signals are generated in a memory resident look-up table (303) which generates 2n samples per input sample (one for each of the mixers). These samples are also applied to the selection logic (213). The output of algebraic multipliers (mixers 203 and 205) is applied to the lowpass filters (207 and 209), which may be realized as IIR 4 pole Butterworth digital filters if used, and then to the differential detector (211). The sine signal samples from mixer 203 are squared and summed from sample time $t=0$ to $t=$time max in the summer (305) to generate signal "A". Optionally, a true RMS of the sine signal samples may be obtained by taking a square root of the sum of the squared n samples. Likewise, the cosine signal samples from the mixer (205) are squared and summed in the summer (307) to generate signal "B". The absolute magnitude of the difference of signal A and signal B is taken in the subtractor (309) to provide the output to the selection logic (213).

This signal processing is used by each of the n pairs of mixers and an output from each differential detector is applied to the selection logic (213). The selection logic (213) also receives a signal from the look-up table (303) corresponding to the two phases of each of the n frequencies (i.e. 2n signals). The selection logic (303) uses conventional digital comparison to pick the frequency with the greatest difference in phases and outputs one of the phases of that frequency that will cause a minimum phase discontinuity with the frequency chosen for the previous scrambled time period.

Figure 5:
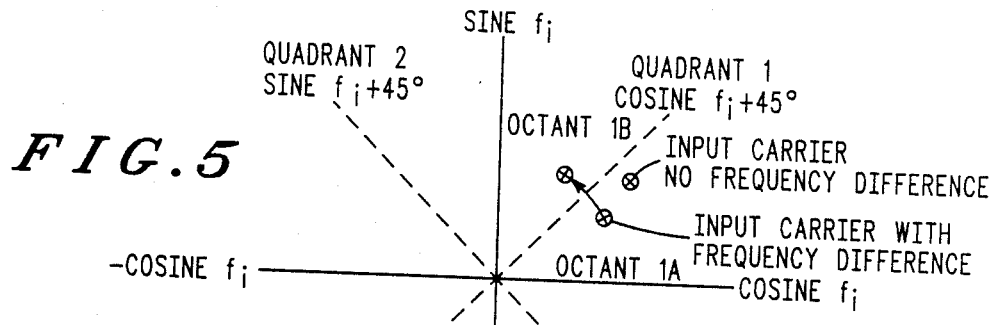
FIG. 5 is an XY coordinate graph useful in understanding the detection process of FIGS. 2, 3, and 4.
Figure 4:
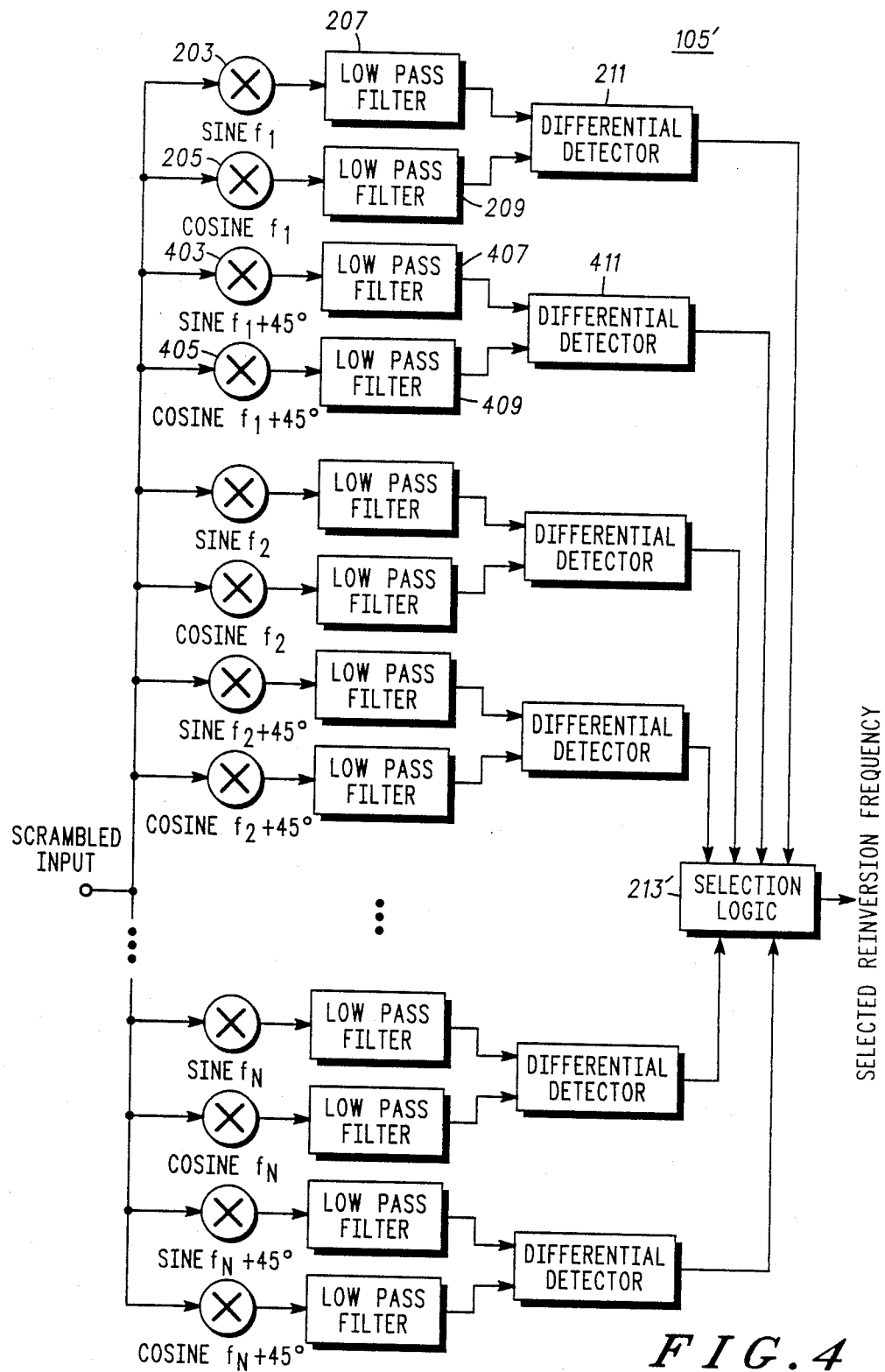
FIG. 4 is a block diagram of an energy detection circuit for a descrambler employing six frequency inversion frequencies and circuitry to resolve mid-quadrant inversion frequency ambiguities.

FIG. 4 is a block diagram of an alternative embodiment of the energy detection circuit (105') which has been augmented by a second set of n pairs of sine/cosine detectors and filters for each of the n scrambling tone frequencies. One of the additional pairs corresponding to the sine/cosine pair for frequency $f_1$ is shown as mixer (403) and mixer (405) respectively coupled to lowpass filters (407) and (409). An analog tone corresponding to the sine tone of $f_1$ and having a 45° phase shift is applied to the mixer (403) while a tone of frequency $f_1$ but having a phase shift of 45° from the cosine tone $f_1$ is applied to mixer (405). The output of mixer (403) and the output of mixer (405) are then applied to conventional lowpass filters (407 and 409), respectively. The outputs of lowpass filters (407 and 409) are applied to differential detector (411) which functions like differential detector (211) previously described for the sine and cosine tones. Likewise, similar pairs of sine/cosine signals, each shifted by 45° from their respective sine and cosine tones, are utilized for signal detection pairs from frequencies $f_2 \rightarrow f_n$. The additional set of XY coordinate axis formed by the 45° shifted sine and cosine signals can be represented by an XY coordinate axis that is offset by 45° from the original axis of the sine/cosine pair. This may be graphically represented as shown in FIG. 5. The implementation of the alternative embodiment using a digital signal processor is similar to that of FIG. 3 with 4n samples available from the look-up table (303) for each (scrambled) input sample and the selection logic (213) selecting one selected frequency from among 4n possible frequency/phase signals.

Referring now to FIG. 5, the improvement offered by the 45° rotation of these additional axes can be apprehended. A carrier could exist in quadrant one of the appropriate detector but would not be properly detected because it could lie near the 45° line of the primary (sine/cosine) axes, thus having equal amounts of energy along both the sine and cosine axis even though it has frequency and phase which are coherent with the transmitting carrier. The second set of 45° rotation detectors properly detects such an inversion frequency signal. Another feature of the additional axes is that a frequency inversion signal with a slight frequency offset might travel from octant 1A to octant 1B during the time segment. This phase migration could confuse a 2-axis detector but not the 4-axis detector of the alternative embodiment of the present invention.

Referring again to FIG. 4, the output from differential detector (211) and the differential detector (411) and the remaining differential detectors for all frequency signals from $f_2 \rightarrow f_n$ are applied to selection logic (213') which is a simple digital comparator and functions by comparing the energy-related difference values for all 2n difference detectors. The output from selection logic (213') is applied to descrambler circuit (107) to select the desired reinversion frequency.

Figure 6:
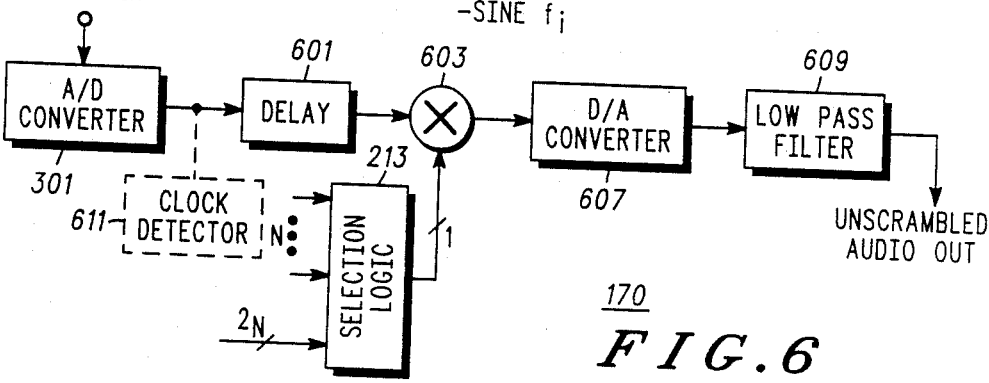
FIG. 6 is a block diagram of the frequency reinversion circuit employed in the present invention.

A preferred embodiment of the descrambler circuit of the present invention is shown in FIG. 6. The scrambled audio input is digitized in the A/D converter (301) and applied to an conventional analog delay circuit (601) where it is delayed for the time segment being analyzed by the detection circuit (105). The output from the analog delay (601) is applied to a digital mixer (603), which may be a conventional algebraic multiplier. A second input to mixer (603) is from the selection logic (213) which selects one of the two or four phases of the selected carrier frequency that was used as part of the detection process of energy detection circuit (105). The specific phase is chosen in a manner such that its phase discontinuity with the previously selected carrier at the audio segment boundary is minimized. The reinverted signal from the mixer (503) is applied to conventional D/A converter (607) and low pass filter (609) and output as unscrambled audio.

A clock detector circuit (611) may be employed to recover the time segment boundaries. In the preferred embodiment, where the time segment can from time to time be determined by a synchronizing burst of signal, a clock detector (611) is not necessary to provide timing control. The detection process is asynchronous; it operates with segments which are shorter than the scrambled segments. A pseudorandomly varying transmitted segment length should not "fool" this detection apparatus.

Thus an apparatus for decoding frequency inversion based scramblers has been described and shown. A quadrature amplitude modulation detector determines the frequency of the tone used for inverting the scrambled signal by determining which of a plurality of quadrature detector pairs, each using a different conversion frequency, has the greatest magnitude difference between the quadraturely related signals. The frequency of the quadrature pair with the greatest difference is the frequency of the inverting tone during the inverting period of time. This frequency information is used to generate a reinversion tone to unscramble the scrambled signal. An ambiguity caused by the scrambled signal inversion tone yielding equal energy in both quadrature channels is resolved by employing a second pair of quadrature detectors for each inversion frequency but having the phase of the conversion frequency displaced from the primary quadrature detector pair by 45°. While a particular embodiment of the invention has been shown and described, it should be understood that the invention is not limited thereto since modifications may be made by persons skilled in the art without departing from the true spirit of the invention. For example, and without limitation, the quadrature detector of the present invention may be used to determine the conversion frequency of a superheterodyne single sideband receiver. It is therefore contemplated to cover the present invention and any and all such modifications by the appended claims.

We claim:

1. A quadrature amplitude modulation detector for determining a frequency of an input signal, comprising:
   a first quadrature signal detector generating a first difference signal having a magnitude related to a difference between first quadraturely related signals;
   a second quadrature signal detector generating a second difference signal having a magnitude related to a difference between second quadraturely related signals;
   means for determining which of said first difference signal and said second difference signal has a greater magnitude;
   means, responsive to said means for determining, for generating a conversion signal; and
   means, coupled to said means for generating a conversion signal, for mixing the input signal with said conversion signal to produce an output signal.

2. A quadrature amplitude modulation detector in accordance with claim 1 wherein said first quadraturely related signals and said second quadraturely related signals further comprise quadraturely related signals of a first and second frequency, respectively.

3. A quadrature amplitude modulation detector in accordance with claim 1 wherein said second quadraturely related signals further comprise signals displaced in phase from said first quadraturely related signals 4. A method of determining a frequency of an input signal employing quadrature amplitude modulation detection, comprising the steps of:
   generating a first difference signal having a magnitude related to a difference between first quadraturely related signals;

generating a second difference signal having a magnitude related to a difference between second quadraturely related signals;

determining which of said first difference signal and said second difference signal has a greater magnitude;

generating a conversion signal in response to said determining step; and mixing the input signal with said conversion signal to produce an output signal.

5. A decoder for a frequency inversion scrambler employing a quadrature amplitude modulation detector for determining a frequency of inversion of a scrambled input signal, comprising:

an energy detection circuit further comprising:
 (a) a first quadrature signal detector generating a first difference signal having a magnitude related to a difference between quadrature signals of a first frequency,
 (b) a second quadrature signal detector generating a second difference signal having a magnitude related to a difference between quadrature signals of a second frequency,
 (c) means for determining which of said first difference signal and said second difference signal has a greater magnitude; and a descrambler circuit further comprising:
 (a) means, responsive to said means for determining, for generating a reinversion signal, and
 (b) means, coupled to said means for generating a reinversion signal, for mixing the input signal with said reinversion signal to produce an unscrambled output signal.

6. A decoder for a frequency inversion scrambler in accordance with claim 5 further comprising a third quadrature signal detector generating a third difference signal having a magnitude related to a difference between quadrature signals of said first frequency and a fourth quadrature signal detector generating a fourth difference signal having a magnitude related to a difference between quadrature signals of said second frequency, said third and fourth quadraturely related signals being displaced in phase from said first and second quadraturely related signals 7. A decoder for a frequency inversion scrambler in accordance with claim 6 means for determining further comprises means for determining which of said third difference signal and said fourth difference signal has a greater magnitude.

8. A radio receiving apparatus for receiving frequency inversion scrambled signals and employing a quadrature amplitude modulation detector for determining a frequency of inversion of a received scrambled signal, comprising:

a radio receiver;

an energy detection circuit further comprising:
 (a) a first quadrature signal detector generating a first difference signal having a magnitude related to a difference between quadrature signals of a first frequency,
 (b) a second quadrature signal detector generating a second difference signal having a magnitude related to a difference between quadrature signals of a second frequency,
 (c) means for determining which of said first difference signal and said second difference signal has a greater magnitude; and a descrambler circuit further comprising:
 (a) means, responsive to said means for determining, for generating a reinversion signal, and
 (b) means, coupled to said means for generating a reinversion signal, for mixing the received scrambled signal with said reinversion signal to produce an unscrambled output signal.

* * * * *